Patented July 20, 1948

2,445,393

UNITED STATES PATENT OFFICE 2,445,393

NEW AMINO-DERIVATIVES OF DIOXA-CYCLOPENTANE

Ernest Fourneau, Paris, France, assignor to Societe des Usines Chimiques Rhone Poulenc, Paris, France, a French body corporate No Drawing. Application June 26, 1946, Serial No. 679,583. In France March 8, 1944

Section 1, Public Law 690, August 8, 1946
Patent expires March 8, 1964

5 Claims. (Cl. 260—338)

1

The invention relates to new and useful amino derivatives of dioxa-cyclopentane and has for its main object to provide new such derivatives which are of considerable technical value especially in the pharmaceutical field.

The new compounds of the present invention are 4-dialkylaminomethyl - 1:3 - dioxa-cyclopentanes which, in general, conform to the general formula:

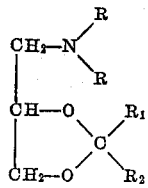

(where R denotes an alkyl group, $R_1$ denotes a radical selected from the class consisting of a hydrogen atom and alkyl groups and $R_2$ denotes a radical selected from the class consisting of a hydrogen atom and alkyl, aralkyl and aryl groups). The invention also includes the quaternary salts of these compounds.

According to a feature of this invention, these new compounds are prepared by the reaction of cyclic acetals of the α-monochlorhydrin of glycerine (or the corresponding brom- or iodohydrins) with a dialkylamine. The corresponding quaternary salts are obtained by treating the amines so produced with an alkyl halide. The quaternary ammonium salts are of particular interest on account of their remarkable physiological properties which make them useful pharmaceutical products.

The following, non-limitative examples show how the invention may be put into practice.

Example I 30 g. of the formal of glycerol α-monochlorhydrin (prepared according to Verley, Bull. Soc. Chimique de France (3), vol. 21 (1889), p. 276) are heated at 160° C. for 18 hours with 110 c. c. of a commercial benzene solution of anhydrous dimethylamine. On cooling, the dimethylamine hydrochloride thus formed is filtered off, the benzene removed from the filtrate and the residue fractionated under reduced pressure. The product, 4-dimethylamino-methyl-1: 3-dioxa-cyclopentane, boils at 68° C. under a pressure of 21 mm. of mercury.

50 g. of the foregoing base dissolved in 150 c. c. of alcohol are mixed with 75 g. of methyl iodide. After a few minutes, the methiodide of the base crystallises out in a very pure state. After recrystallisation from alcohol, it melts at 158–160° C.

Example II

Starting with 4-chlormethyl-2-methyl-1:3-dioxa-cyclopentane (prepared according to Willfang, Ber., 74 (1941) 150) and operating as just described, 4-dimethyl aminomethyl-2-methyl-1:3-dioxa-cyclopentane is obtained. It boils at 65° C./17 mm. Hg, and forms a methiodide, M. P. 140° C.

Example III

By the same method, starting with 4-chlormethyl - 2:2 - dimethyl - 1:3-dioxa-cyclopentane (prepared by the condensation of acetone with epichlorhydrin in the presence of tin tetrachloride) 4-dimethylaminomethyl-2:2-dimethyl-1:3-dioxa-cyclopentane is obtained. It boils at 69° C./17 mm. Hg and forms a methiodide, M. P. 208° C.

Example IV

Similarly, 4 - chlormethyl-2-phenyl-1:3-dioxa-cyclopentane (prepared by the condensation of benzaldehyde with epichlorhydrin in the presence of tin tetrachloride and boiling at 164° C./30 mm.) yields 4 - dimethylaminomethyl-2-phenyl-1:3-dioxa-cyclopentane, B. P. 147° C./30 mm. Hg, and forming a methiodide M. P. 160° C.

All the cyclic aminomethyl acetals described above are characterized by a very great instability to mineral acids, even in the cold. On the other hand, they are very stable to alkalis and the neutral salts formed with organic acids are relatively stable in solution.

I claim:

1. Dioxa-cyclopentane derivatives of the general formula:

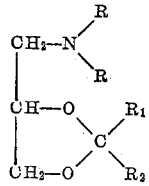

(wherein R denotes a lower alkyl group, $R_1$ denotes a radical selected from the class consisting of hydrogen atoms and lower alkyl groups, and $R_2$ is selected from the class consisting of hydrogen atoms, lower alkyl groups and phenyl groups) and their quaternary salts.

2. 4 - dimethylaminomethyl - 1:3 - dioxacyclopentane and its quaternary salts.

3. 4 - dimethylaminomethyl - 2-methyl - 1:3 - dioxacyclopentane and its quaternary salts.

4. 4-dimethylaminomethyl-2:2-dimethyl-1:3-dioxacyclopentane and its quaternary salts.

5. 4-dimethylaminomethyl-1:3-dioxacyclopentane methiodide.

ERNEST FOURNEAU.

REFERENCES CITED

The following references are of record in the file of this patent:

UNITED STATES PATENTS

| Number | Name | Date |
|---|---|---|
| 1,790,042 | Eisleb | Jan. 27, 1931 |
| 1,977,253 | Stallmann | Oct. 16, 1934 |

OTHER REFERENCES

Willfang-Berichte 74, 145 (1941). (Copy in Scientific Library.)

Disclaimer 2,445,393.—*Ernest Fourneau*, Paris, France. NEW AMINO-DERIVATIVES OF DIOXA-CYCLOPENTANE. Patent dated July 20, 1948. Disclaimer filed Nov. 8, 1951, by the assignee, *Societe des Usines Chimiques Rhone Poulenc*.

Hereby enters this disclaimer to as much of the claim 1 of said patent as is in excess of the following:

Dioxacyclopentane derivatives of the general formula:

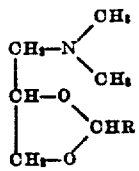

(wherein R denotes a radical selected from the class consisting of hydrogen atoms and methyl radicals) and their quaternary salts, and also hereby enters this disclaimer to claim 4 of said patent.

[*Official Gazette December 18, 1951.*]